United States Patent Office 3,553,014
Patented Jan. 5, 1971

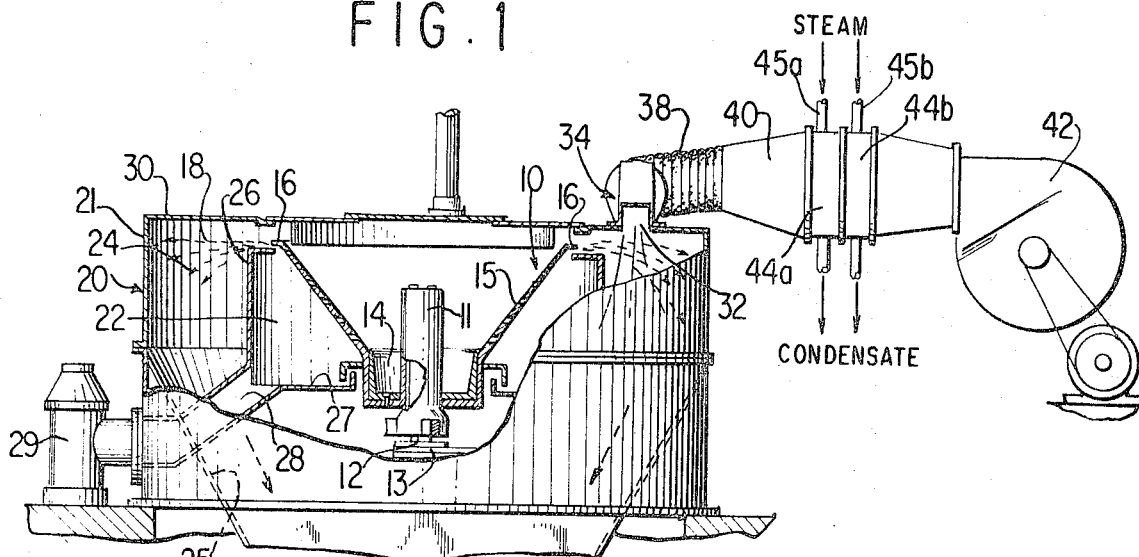
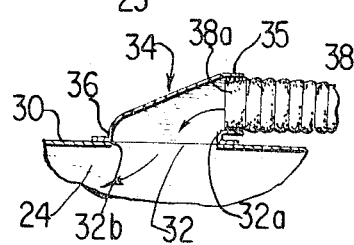
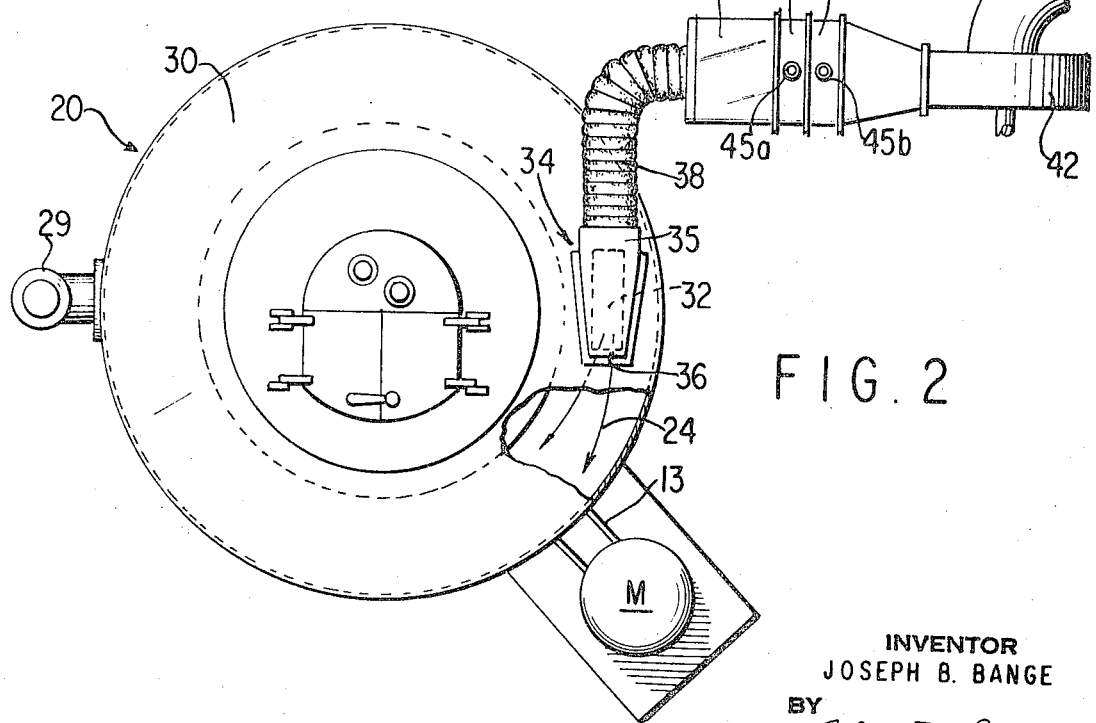

3,553,014
CONTINUOUS CENTRIFUGAL APPARATUS AND METHOD FOR PRODUCING SHIPPING SUGAR
Joseph B. Bange, 437 Edwards Ave.,
Hamilton, Ohio 45013
Filed Feb. 19, 1968, Ser. No. 706,251
Int. Cl. B01d 33/40; C13f 1/06, 1/10
U.S. Cl. 127—19   8 Claims

ABSTRACT OF THE DISCLOSURE

Raw sugar of shipping quality is produced from A or B massecuite in a continuous conical screen centrifugal machine with the required rate of output and keeping quality, by passing the purged sugar grains flying from the rim of the centrifugal basket into, and then from the machine with, a whirling annulus of hot air maintained constantly in downward displacement within the sugar compartment of the machine by a massive air inflow heated to a temperature above 115° F., as by means of a blower delivering air through a heat exchanger and thence through an intake substantially tangential to the head of the sugar compartment.

---

This invention relates to the manufacture of raw sugar such as the shipping sugar of 96° or higher polarization that is recovered from A and B massecuites in cane sugar factories. More particularly, the invention provides an apparatus and a method for producing such sugar in shipping condition more economically and more reliably than in prior practices, delivering it as a direct product of the treatment of such massecuites in continuous centrifugal machines of the conical basket type.

Such continuous centrifugal machines have had extensive uses for the separation of very small sugar grains from molasses in the low-grade or final massecuite stages of sugar factory and refinery operations. They have had but limited use for the treatment of purer massecuites such as those from which commercial raw sugar is recovered, due to limitations upon their ability to discharge treated sugar at the rate required for economical production while producing the sugar with degrees of purity and dryness giving it the required factor of safety.

The factor of safety of raw sugar is a measure of the ability of the sugar to resist deterioration and lumping in storage and in transit to a refinery. It is represented by the quotient of the percent of moisture in the sugar divided by the difference between 100 and the degree of polarization of the sugar, and is commonly required to have a value not greater than 0.3. Thus, the higher the polarization or purity of the raw sugar, the lower its moisture content must be for commercial acceptance of it as a shipping sugar having the required keeping qualities.

It has been discovered that raw sugar having the required low relationship of moisture content to a polarization of 96° or higher can be obtained directly from A, B or like massecuite by the operation of a continuous centrifugal machine of the conical basket type with the required through-puts or production rates, if the purged sugar grains flying continuously from the rim of the centrifugal basket are thrown into, and then passed through and out of the sugar compartment of the machine with, a whirling annulus of hot air maintained at a temperature above 115° F. and constantly in downward displacement within the sugar compartment by a massive inflow of heated air forced continuously into the head of the sugar compartment.

In order to maintain the axially moving whirling annulus of hot air, the centrifugal machine is connected with a blower which draws air from the environs of the machine, or from a system for the recirculation of used heated air if desired, and forces a massive stream of the air through an air heater and thence at a desired temperature between 115° and 180° F. through a duct leading to a suitable intake opening formed in the casing of the machine at the head of the annular sugar compartment provided therein.

The heated air stream is delivered to the machine in a volume of at least 1500 cubic feet per minute, which ordinarily is kept in the range of 2000 to 3000 cubic feet per minute. The intake opening is directed into the head of the sugar compartment in substantially tangential relation to the outer periphery thereof and so that the hot air forced thereinto will have a direction of flow corresponding to the direction of rotation of the basket rim and will maintain a spirally whirling annulus of air at a temperature above 115° F. within the sugar compartment and across the path of flight of the purged sugar grains thrown from the basket rim.

The temperature of the heated air stream must be kept at least as high as 115° F., and advantageously is held between about 120° and 150° F., and the volume of the massive air flow must be greater as its temperature is lower, in order to obtain the raw sugar product from the continuous centrifugal machine with the required rate of production and factor of safety. While temperatures of 150° to 180° F. and even considerably higher air stream temperatures up to 200 to 210° F. will also give the required drying effect, the temperature ordinarily should not exceed about 150° F. and, indeed, should be kept near the lower end of the effective range where the flow volume can be kept sufficiently great, such as above 2000 c.f.m., so that the heat level maintained at the machine and its environs will be tolerable to personnel attending the operation of the machine in the sugar factory.

The foregoing and other objects, features and advantages of the invention will become further apparent from the following detailed description and the accompanying drawing of an illustrative embodiment thereof.

In the drawing:

FIG. 1 is a schematic elevational view, partly in cross-section, of a continuous centrifugal apparatus according to the invention;

FIG. 2 is a top plan view thereof; and

FIG. 3 is a fragmentary cross-sectional view of the hot air intake, taken along line 3—3 of FIG. 2.

The centrifugal machine shown schematically in the drawing is generally similar to a kind of continuous centrifugal often used in the low grade or final massecuite stage of sugar factory or refinery operations. It includes an upwardly open conical basket 10 having, for example, an outside diameter of approximately 40 inches at its upper end, which is mounted through a central bearing housing 11 for rotation about a vertical axis on a shaft 12 driven by belts 13 from a motor M (FIG. 2). A casing 20 encloses the basket and forms around it separate annular syrup and sugar compartments 22 and 24 for continuously collecting and guiding out of the machine the liquid and solid components which are separated by the spinning basket.

The basket 10 has a closed lower end containing a cup 14 which receives a continuous stream of massecuite pouring from a loading pipe or spout (not shown). This cup accelerates the inflowing massecuite so as to flow it in a thin layer over a fine filtering screen (not shown) covering the upwardly divergent perforated frusto-conical basket wall 15. As the material progresses over the screened conical basket wall, the free molasses or syrup content is expelled through the screen and basket perforations into the syrup compartment 22, while the sugar grains retained by the screen are forced along its inner surface to the discharge rim 16 at the open upper end of the basket. From that rim the purged sugar grains are thrown outwardly in a spreading path of flight, indicated generally at 18, which spans the space between the rim 16 and a suitable curb structure such, for example, as the inner surface 21 of the upright outer wall of casing 20.

The discharged sugar grains fall through the sugar compartment 24 into a convergent chute 25 at its lower end, which collects the grains and guides them out of the casing in known manner. The syrup purged through the screened basket wall 15 meanwhile is collected within the upright partition 26 of the syrup compartment 24 and flows to floor 27 thereof from which it drains out of the casing through a duct 28 leading into an external receptacle or standpipe 29.

If a centrifugal machine of the kind shown and described were used in known manner for the recovery of raw sugar from A or B massecuite, as produced in a cane sugar factory, the purged sugar grains collected in and delivered from the lower portion 25 of the sugar compartment 24 would ordinarily not have the required factor of safety, or shipping quality, unless the rate of feed of massecuite to the machine were so low as to make the operations uneconomical. With the massecuite feed rate high enough for the economical use of such a machine, the sugar product ordinarily would have a moisture content so high in relation to its purity, which must correspond to a polarization of 96° or higher, that it would be susceptible to forming hard lumps and to fermentation or other spoilage in the course of the storage and the transportation that usually precede its conversion into white sugar at a refinery.

That problem can be overcome according to the present invention, so that commercial raw sugar having the required shipping quality will be obtained economically from the continuous centrifugal machine, by maintaining in the sugar compartment 24 a whirling annulus of hot air which is held at a temperature above 115° F. and is constantly displaced downwardly through that compartment by a massive inflow of heated air forced continuously into the head of the sugar compartment. The purged sugar grains flying from the discharge rim 16 of the basket in path 18 thus are thrown into and across the whirling annulus of hot air, and they pass in and with it through the sugar compartment while falling and being in part blown therealong for delivery from the machine.

In the illustrated embodiment of the invention the top wall 30 of the centrifugal casing is formed, at a location near the outer periphery of the sugar compartment 24, with a hot air intake opening 32 of substantially rectangular shape which is elongated in the tangential direction. This opening is encompassed at its upper side by an intake hood 34 that slopes from a wide mouth portion 35 located near the forward end 32a of the intake opening to a closed end portion 36 of little height covering the backward end 32b of the intake opening. The wide mouth portion of the intake hood is made to receive one end 38a of an air duct 38 fitted thereinto, this duct being, for example, a flexible hose of circular cross-section having a diameter of approximately 9 to 10 inches.

The other end of the duct 38 is connected with a head chamber 40 into which a large volume of heated air, for example, 2,500 to 2,600 cubic feet per minute, is blown continuously under pressure by a blower 42. Heat exchangers 44a and 44b of well known nature are disposed across the path of air being blown into chamber 40 and are maintained, as by regulated inflows of steam into them through pipes 45a and 45b, at temperatures high enough to heat the air blown through them to a required elevated temperature above 115° F. and preferably below 150° F., such, for example, as a temperature of about 120–125° F.

A blowing pressure equivalent to about 8 to 12 inches of water column, such as one of approximately 9–10 inches, is usually effective to maintain the required volume of the heated air stream.

The air entering the blower 42 through its intake duct 42a may be taken from the environs of the centrifugal machine in the raw sugar factory. Ordinarily, steam for the required heating of the air is available in ample supply at a raw sugar factory. It will be understood, of course, that if desired the still hot air that has been forced through and out of the sugar compartment 24 with the granular sugar product may be collected, dried and recirculated to the blower intake, to effect savings of heating energy.

The hot air stream forced continuously through the intake opening 32 in the casing top enters the head of the sugar compartment substantially tangentially and in a direction corresponding to, rather than opposing, the direction of rotation of the centrifugal basket 10 and the air current produced by the basket rotation. The mass and the temperature of the inflowing hot air stream are sufficiently great that an annular body of air having approximately the same temperature is kept whirling about and in, i.e., downwardly within displacement axially along the sugar compartment 24 and the lower or chute portion 25 thereof. The purged sugar grains flying tangentially from the basket are thrown along paths located approximately in the plane at 18, thus passing directly into and across this whirling annular body of hot air and being kept in continuing intimate contact with it as they fall through the sugar compartment for delivery from the machine.

In this way, a very considerable amount of the moisture which otherwise would be retained by the purged sugar grains is removed from them in the course their passage from the spinning basket through and out of the surrounding casing, so that raw sugar having the necessary polarization of 96° of higher together with a very low moisture content giving the product the required factor of safety is recovered at an economical rate of production directly from the continuous centrifugal machine.

It has been found possible by the present invention to produce raw sugar of desirable shipping grades with massecuite through-puts enabling the economical and efficient utilization of continuous centrifugal machines for this work. An efficient output of the sugar can be delivered directly from the centrifugal not only with the required degree of polarization or purity but also with the low moisture content necessary for assurance that the grains will not form hard lumps or spoil during storage or in transit to a refinery.

So far as known to applicant, equivalent results have not been obtained in any other way.

What is claimed is:

1. The method of producing shipping sugar directly from A, B or like massecuite in a centrifugal machine having a continuously rotated conical screen basket, wherein the free syrup of a continuous inflow of the massecuite is purged through the conical screen while the sugar grains are passed over the screen to a rim of the basket from which they fly outwardly into an annular sugar compartment of a casing surrounding the basket, which comprises throwing the purged sugar grains from said rim into, and discharging them from said casing with, a whirling annulus of air maintained within said compartment while constantly displacing said annulus of air downwardly within said compartment and maintaining it at a temperature above 115° F. by a massive flow of at least 1500 cubic feet per minute of heated air forced continuously into the head of said compartment.

2. The method of claim 1, said massive flow of heated air being at a temperature between about 120° and 150° F.

3. The method of claim 1, said massive flow of heated air being at a temperature between 120° and 150° F.

and having a volume of from 2000 to 3000 cubic feet per minute.

4. The method of claim 1, said massive flow of heated air being directed substantially tangentially into said sugar compartment at the top and near the outer periphery thereof and in the direction of the rotation of said basket.

5. A continuous centrifugal apparatus for producing shipping sugar from A, B or like massecuite, comprising, in combination with an upwardly open conical screen basket adapted to be continuously rotated within a surrounding casing and means for feeding a stream of the massecuite continuously into said basket, said casing having an upwardly open annular compartment therein to collect and deliver downwardly sugar grains flying outwardly from the upper end of the basket, means including a blower for delivering a stream of air through an air heater and thence through duct means into the head of said sugar compartment for maintaining across the path of flight of said sugar grains from the basket, and constantly in displacement downwardly within said compartment at a rate exceeding 1500 cubic feet per minute a whirling annulus of air at a temperature above 115° F.

6. An apparatus according to claim 5, said duct means comprising an intake opening directed into the top of said compartment in substantially tangential relation to the outer periphery thereof.

7. An apparatus according to claim 5, said duct means comprising an elongated substantially rectangular intake opening leading through the top wall of said casing into said sugar compartment, said opening lying near the outer periphery of said compartment with its longer dimension in the direction substantially tangential thereto, an intake hood covering said opening and tapering from a relatively wide mouth portion near one end of said opening to an end portion of relatively little height near the other end of said opening, and an air duct connecting said mouth portion with a chamber at the output side of said air heater.

8. An apparatus according to claim 5, said blower and said heater being operative to deliver through said duct means into the top of said compartment a stream of from 2000 to 3000 cubic feet per minute of air heated to a temperature between about 120° and 150° F.

References Cited
UNITED STATES PATENTS

| | | | |
|---|---|---|---|
| 1,546,871 | 7/1925 | Thompson | 210—215X |
| 1,786,349 | 12/1930 | Koplin | 210—178 |
| 2,631,728 | 3/1953 | Popp | 210—179X |
| 2,883,054 | 4/1959 | Sanchez | 127—19X |
| 3,238,063 | 3/1966 | Steele | 127—19 |
| 3,385,443 | 5/1968 | Cuza | 210—178 |

MORRIS O. WOLK, Primary Examiner

D. G. CONLIN, Assistant Examiner

U.S. Cl. X.R.

127—63, 64; 210—78, 215, 369